R. W. WIEDERWAX.
HEATING DEVICE FOR THE WATER CIRCULATION SYSTEMS OF ENGINES OF AUTOMOBILES.
APPLICATION FILED FEB. 9, 1920.
1,371,589.
Patented Mar. 15, 1921.
3 SHEETS—SHEET 1.
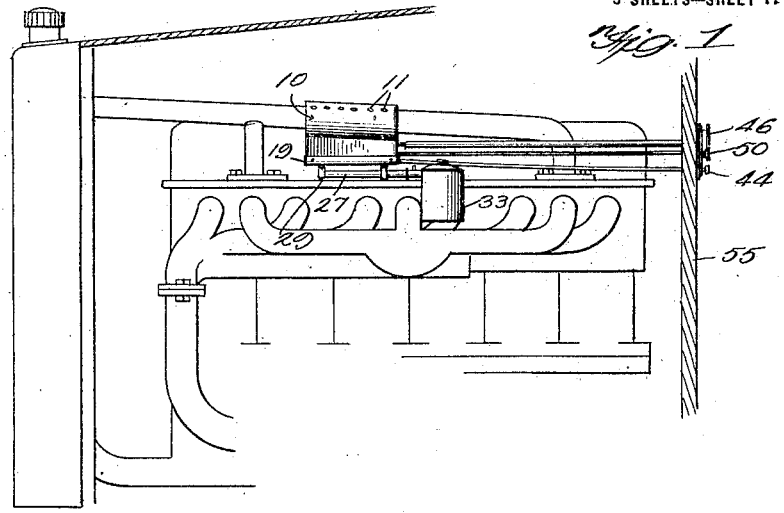
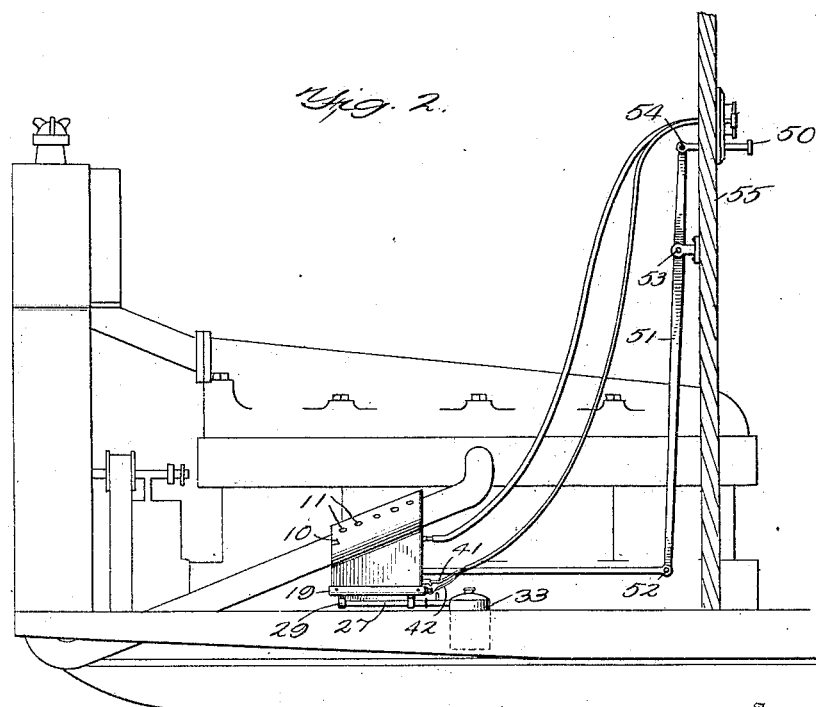
Inventor
Robert W. Wiederwax,
By [signature]
Attorney

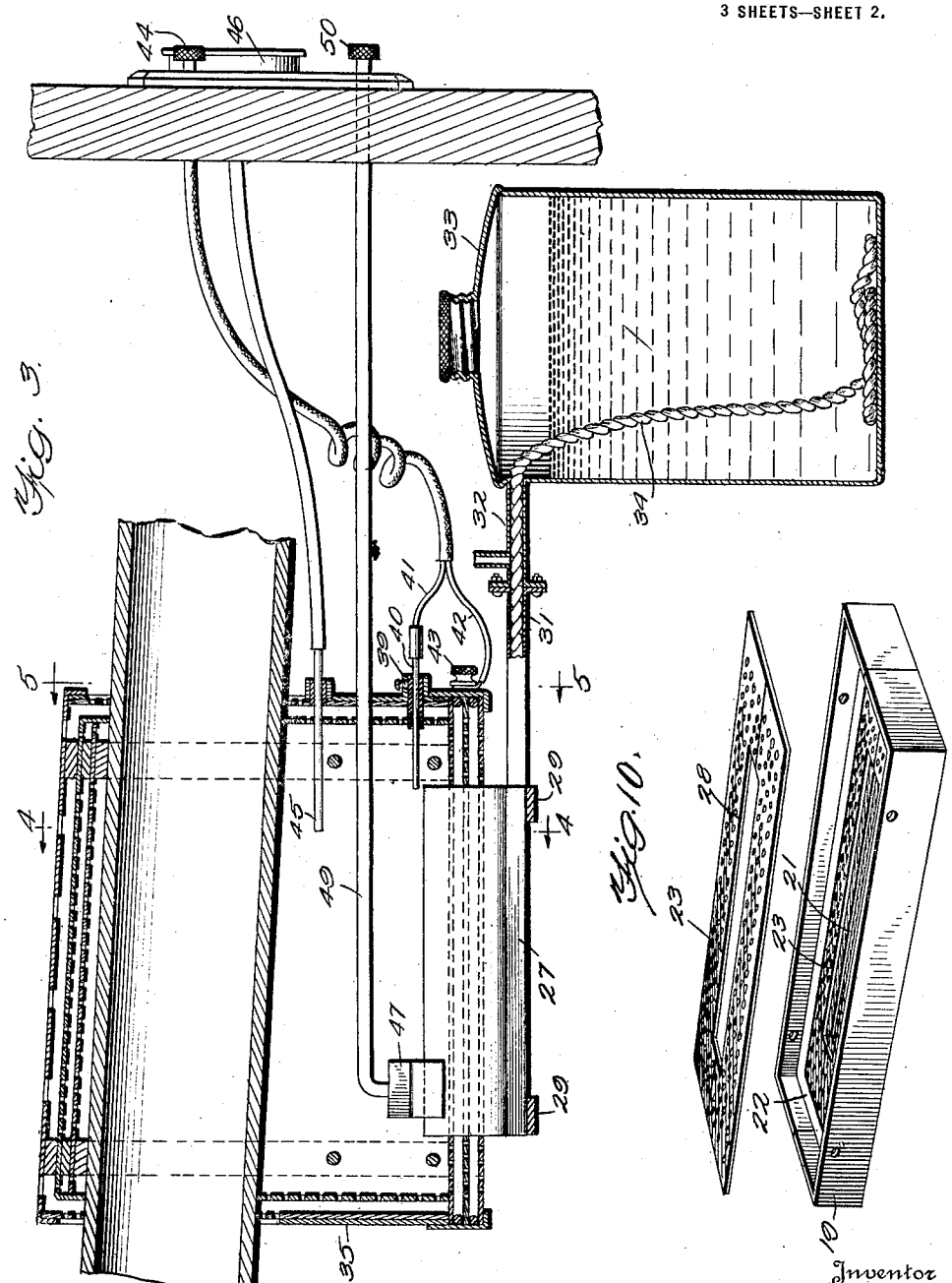

R. W. WIEDERWAX.
HEATING DEVICE FOR THE WATER CIRCULATION SYSTEMS OF ENGINES OF AUTOMOBILES.
APPLICATION FILED FEB. 9, 1920.
1,371,589.
Patented Mar. 15, 1921.
3 SHEETS—SHEET 3.
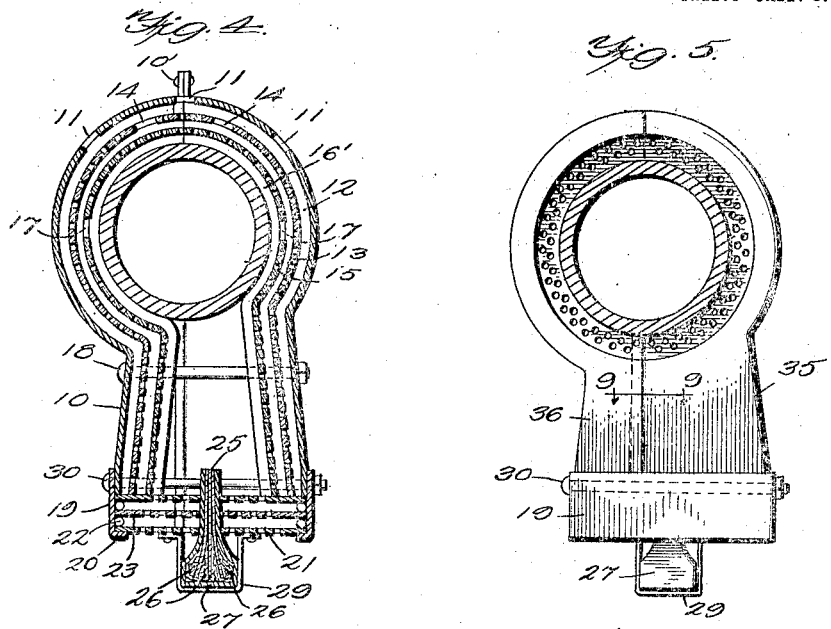
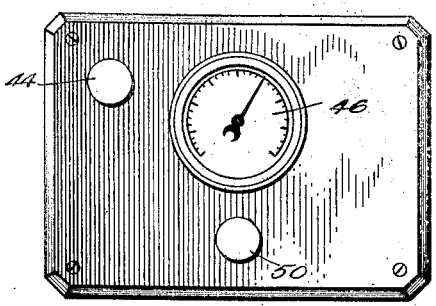
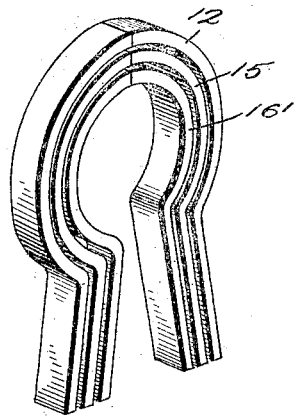
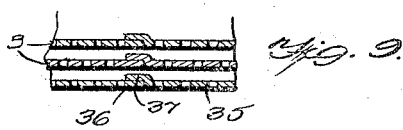
Inventor
Robert W. Wiederwax,
By [signature]
Attorney

UNITED STATES PATENT OFFICE.

ROBERT W. WIEDERWAX, OF ATLANTIC CITY, NEW JERSEY, ASSIGNOR OF ONE-HALF TO CARLTON GEIST, OF ATLANTIC CITY, NEW JERSEY.

HEATING DEVICE FOR THE WATER-CIRCULATION SYSTEM OF ENGINES OF AUTOMOBILES.

1,371,589.     Specification of Letters Patent.     Patented Mar. 15, 1921.

Application filed February 9, 1920. Serial No. 357,419.

*To all whom it may concern:*

Be it known that I, ROBERT W. WIEDERWAX, a citizen of the United States, residing at Atlantic City, in the county of Atlantic and State of New Jersey, have invented certain new and useful Improvements in Heating Devices for the Water-Circulation Systems of Engines of Automobiles, of which the following is a specification.

This invention relates to improvements in heating devices for the water circulation systems of the engines of automobiles and the like.

An important object of the invention is to provide a heating unit to be used in connection with automobile engines which may be readily adapted to all standard makes of automobiles without in any manner altering the construction of the engine.

A further object is to provide a device of the above mentioned character which may be adapted to the engine without the necessity of boring holes in the water circulation system casings or in any manner altering the original construction of the engine.

A further object of the invention is to provide a heater which will cause the circulation of water, not only through the engine of the automobile, but within the radiator.

A further object of the device is to provide a heater of the above mentioned character which is readily and cheaply constructed and which may be applied with the minimum loss of time.

Other objects and advantages will become apparent throughout the course of the following discussion.

In the accompanying drawings wherein for the purpose of illustration is shown a preferred embodiment of my invention and wherein like numerals designate like parts throughout, Figure 1 is a side elevation of an automobile engine showing my apparatus attached to the water outlet pipe of the engine.

Fig. 2 is a similar view showing my device attached to the water inlet pipe of the engine.

Fig. 3 is a longitudinal section taken through my device.

Fig. 4 is a section taken on the line 4—4 of Fig. 3.

Fig. 5 is a section taken on the line 5—5 of Fig. 3.

Fig. 6 is a plan view of the dash control of my heater.

Fig. 7 is a combined perspective of the spacing elements employed therein.

Fig. 8 is a perspective of the wick employed in my burner, and

Fig. 9 is a fragmentary sectional view taken on the line 9—9 of Fig. 5.

Fig. 10 is a detail perspective view of the lower casing.

Referring now more particularly to the drawings, the numeral 10 indicates an outer casing preferably formed of two sections bolted together at their upper ends as at 10'. This casing is provided adjacent its upper end with apertures 11 for a purpose presently to appear.

Arranged interiorly of the casing 10 and separated therefrom by spacing elements 12 is a foraminous plate 13 provided adjacent its upper end with enlarged apertures 14, these apertures being staggered with relation to the apertures in the casing 10. Arranged interiorly of the plate 13 is a second similar plate 16 separated from the plate 13 by spacing elements 15. This plate is likewise provided at its adjacent end with apertures which are staggered with relation to the apertures in the other two plates, as at 17. Interiorly of the plate 16 are arranged spacing members 16' for a purpose hereinafter to appear. It will be understood that the plates 13 and 16 and the spacing elements 12, 15 and 16' are formed in two sections. The bolt 18 extends through the sections of the casing 10 and plates 13 and 16 securing them together.

A base casing 19 is provided having an open top and bottom and being provided on its bottom edge with an inturned flange 20. Upon this flange rests a foraminous plate 21. Abutting the inner wall of the casing 19 and resting upon the plate 21 is a spacing element 22 formed of wire or the like and upon this spacing element rests a second plate 23 similar to the plate 21. As many of these plates 23 may be provided as is deemed necessary, two being shown in the present illustration.

A wick 24 is provided composed of sections 25 of asbestos closely united at their upper ends and spread at their lower ends and having interposed between their lower ends wool 26 or some other similar substance which forms a ready conductor of liquid fuel. This wick is inserted within a suitable casing 27 which conforms to the shape of the wick. The plates 21 and 23 are provided with longitudinal slots 28 through which the wick casing is inserted, the wick casing being held in position by suitable brackets 29 bolted or otherwise secured to the plate 21. A bolt 30 extends through the side walls of the casing 19 and the lower ends of the casing 10 and plates 13 and 16 further securing these plates together.

Connected with the wick casing 27 is a conduit 31 which in turn is connected with a second conduit 32 which forms an outlet from a fuel tank 33. A wick 34 has one end disposed within the fuel within the tank and the other one extending through the conduit 31 and 32 and engaging against the base of wick 24.

End sections for the casing 10 are provided formed of sections 35 and 36, each provided adjacent its upper end with cut-out portions coacting to form a central aperture, the sections being fitted together by a lap joint 37 or the like. Arranged interiorly of the end sections of the casing are foraminous plates 38. As many of these plates as desired may be provided, two being shown in the present instant, and it will be understood that the plates 38 are formed in sections similarly to the end sections 35 and 36.

Mounted in one of these end sections is an insulating member 39 through which extends a conductor 40 having one end arranged in proximity to the casing 27 of the wick. This conductor is connected with a wire 41 forming one terminal of the circuit the other terminal being formed by wire 42 which is connected with the casing by means of a binding post 43 or the like. These wires are in circuit with a suitable source of electrical supply and also with a push button switch arranged upon the dash of the automobile at a point convenient to the driver. It will be obvious that by closing the switch 44, an electric current will pass through the wire 42 and 43 and a spark will pass from the conductor 40 to the casing 27 of the wick and ignite the wick. Extending through the end wall of the casing is a pyrometer 45 which is operatively connected with a registering dial 46 arranged upon the dash adjacent the switch 44.

I have provided means for controlling the magnitude of and extinguishing the flame of the wick 24 in a member 47 which slidably engages the upper end of the wick casing 27. This member is so formed as to act as a wiper along the upper surface of the wick and will consequently extinguish the flame as moved across the wick. It will be obvious that by moving the member 47 to a desired point that the length of the flame may be governed. The member 47 may be operated by means of a rod 49 connected with the member and slidably mounted in the wall of the casing 10 and in the dash, the rod 49 being provided upon its rear end with an operating handle 57.

In assembling the heater upon the engine, the halves of the casing 10 and plates 13 and 16 are assembled with their various spacing members and the two sections thus formed are placed about the inlet or outlet pipe of the engine as the case may be and secured together by means of the bolts 10' and 18. The base casing 19 with the foraminous plates 21 and 23 and the wick casing and the wick assembled therewith are then placed in position and secured in such position by means of the bolts 30. It will therefore be obvious that the application of my device to the engine of an automobile may be obtained with a minimum loss of time.

When the apparatus is in use the heat from the flame of the wick is directed against the pipe about which the apparatus is assembled and passes around the pipe thoroughly heating the same. While a portion of the heat will escape through the small openings of the foraminous plates 13 and 16, nevertheless a major portion of the heat will pass through the enlarged openings formed therein thus affording a staggered passage way allowing a major portion of the heat to be transmitted to the water within the pipe about which the apparatus is assembled. These foraminous plates and staggered openings together with the foraminous plates 21 and 23 perform a second function in that they prevent the flame from back fire explosions which may be caused by the intake through the draft openings of explosive gases, commonly present in the vicinity of automobile engines, from being transmitted to any of these explosive gases which may lie around the heater.

As many changes are possible in the shape, size, and relation of the various parts herein shown, I do not limit myself to the specific structure herein set forth, but may make any such changes without departing from the spirit of the invention or the scope of the subjoined claims.

What I claim is:

1. In a device for heating the water circulation systems of the engines of automobiles and the like, a sectional casing adapted to be assembled about one of the pipes connecting the water jacket of the engine with the radiator and a heater carried by said casing, embodying an outer casing provided adjacent its upper end with outlet openings, a foraminous plate arranged interiorly of and spaced from said outer casing and provided with outlet openings staggered with relation to outlet openings of said casing, a foraminous plate forming a closure for the bottom of said casing and a burner projecting through said bottom closure.

2. In a device for heating the water circulation systems of the engines of automobiles and the like, a sectional casing adapted to be assembled about one of the pipes connecting the water jacket of the engine with the radiator and a heater carried by said casing, embodying an outer casing provided adjacent its upper end with outlet openings, a foraminous plate arranged interiorly of and spaced from said outer casing and provided with outlet openings staggered with relation to the outlet openings of said casing, a foraminous plate forming a closure for the bottom of said casing and a burner projecting through said bottom closure, said casing and said first named foraminous plate being formed in sections adapted to be assembled about one of the pipes connecting the water jacket of the engine with the radiator thereof.

3. In a device for heating the water circulation systems of the engines of automobiles and the like, a casing having an open bottom and provided in its ends with alined apertures adapted to receive one of the pipes connecting the radiator of the engine with the water jacket thereof, a foraminous plate arranged interiorly of said casing and spaced therefrom, said casing and said foraminous plate having outlet openings formed in the upper end thereof, the opening in said foraminous plate being staggered from the openings in said casing.

4. In a device for heating the water circulation systems of the engines of automobiles and the like, a casing having an open bottom and provided in its ends with alined apertures adapted to receive one of the pipes connecting the radiator of the engine with the water jacket thereof, a foraminous plate arranged interiorly of said casing and spaced therefrom, said casing and said foraminous plate having outlet openings formed in the upper end thereof, the opening in said foraminous plate being staggered from the openings in said casing, said casing and said foraminous plate being formed of separable sections adapted to be assembled about said pipe.

5. In a device for heating the water circulating systems of engines of automobiles and the like, a sectional casing adapted to be assembled about one of the pipes connecting the water jacket of the engine with the radiator, embodying an outer casing provided adjacent its upper end with outlet openings, a plurality of foraminous plates arranged interiorly thereof and spaced therefrom, said plates being provided with outlet openings staggered with relation to the outlet openings of said casing, a base arranged at the bottom of said casing, a plurality of spaced foraminous plates carried by said base and forming a closure for the bottom of said casing, and a burner projecting through said bottom closure.

6. In a device for heating the water circulating systems of engines of automobiles and the like, a sectional casing adapted to be assembled about one of the pipes connecting the water jacket of the engine with the radiator, embodyiing an outer casing provided adjacent its upper end with outlet openings, a plurality of foraminous plates arranged interiorly thereof and spaced therefrom, said plates being provided with outlet openings staggered with relation to the outlet openings of said casing, a base arranged at the bottom of said casing, a plurality of spaced foraminous plates carried by said base and forming a closure for the bottom of said casing, a burner support carried by the lower foraminous plate, and a burner projecting through said bottom closure and resting on said support.

In testimony whereof I affix my signature.

ROBERT W. WIEDERWAX.